No. 762,877. PATENTED JUNE 21, 1904.
A. W. BROWNE.
ARM REST FOR DENTAL CHAIRS.
APPLICATION FILED OCT. 29, 1903.
NO MODEL. 3 SHEETS—SHEET 1.
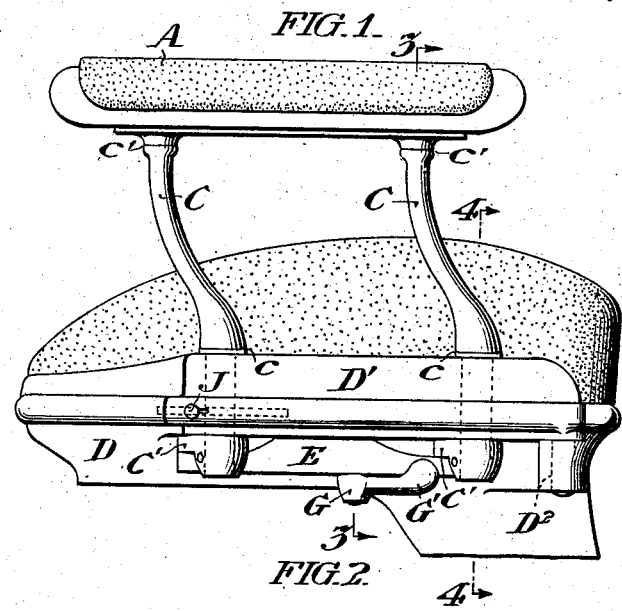
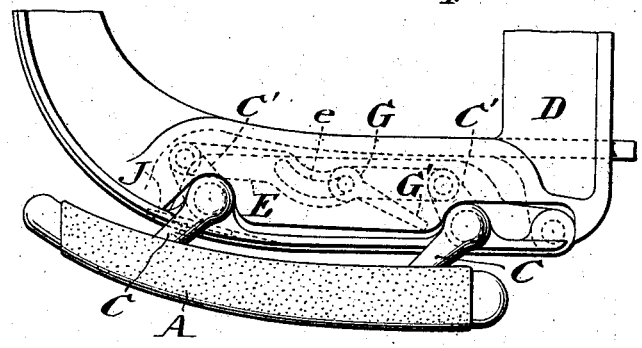
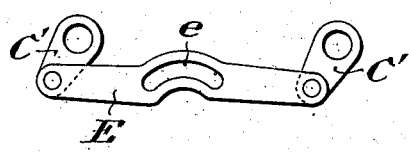
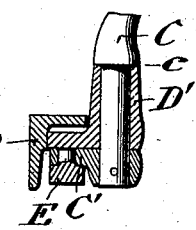
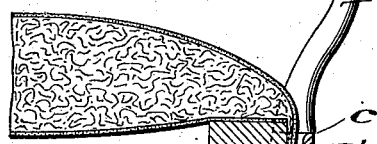
WITNESSES: INVENTOR:
Arthur E. Paige. Arthur W. Browne,
Howard K. Rudolph. by Edward F. Simpson, Jr.
Attorney.
THE NORRIS PETERS CO., PHOTO-LITHO., WASHINGTON, D. C.

No. 762,877. PATENTED JUNE 21, 1904.
A. W. BROWNE.
ARM REST FOR DENTAL CHAIRS.
APPLICATION FILED OCT. 29, 1903.

NO MODEL. 3 SHEETS—SHEET 2.

WITNESSES: INVENTOR:
Arthur W. Browne,
by Edward F. Simpson, Jr.
Attorney.

No. 762,877. PATENTED JUNE 21, 1904.
A. W. BROWNE.
ARM REST FOR DENTAL CHAIRS.
APPLICATION FILED OCT. 29, 1903.
NO MODEL. 3 SHEETS—SHEET 3.

WITNESSES: INVENTOR:
Arthur W. Browne,
by Edward F. Simpson, Jr.
Attorney.

No. 762,877. Patented June 21, 1904.

UNITED STATES PATENT OFFICE.

ARTHUR W. BROWNE, OF PRINCEBAY, NEW YORK, ASSIGNOR TO THE S. S. WHITE DENTAL MANUFACTURING COMPANY, OF PHILADELPHIA, PENNSYLVANIA.

ARM-REST FOR DENTAL CHAIRS.

SPECIFICATION forming part of Letters Patent No. 762,877, dated June 21, 1904.

Application filed October 29, 1903. Serial No. 179,001. (No model.)

*To all whom it may concern:*

Be it known that I, ARTHUR W. BROWNE, a citizen of the United States, residing at Princebay, in the county of Richmond and State of New York, have invented a certain new and useful Improvement in Arm-Rests for Dental Chairs; and I do hereby declare the following to be a full, clear, and exact description of the invention, such as will enable others skilled in the art to which it appertains to make and use the same.

My invention relates to arm-rests for dental chairs, and particularly to that class of arm-rests capable of being adjusted horizontally toward and away from the chair-seat.

The chief object of my invention is to provide an arm-rest of this character that can be quickly and easily adjusted, securely locked in position, and the locking mechanism of which does not project beyond the side of the chair.

The invention consists in certain improvements indicated in the accompanying drawings and described and claimed hereinafter.

Figure 6:
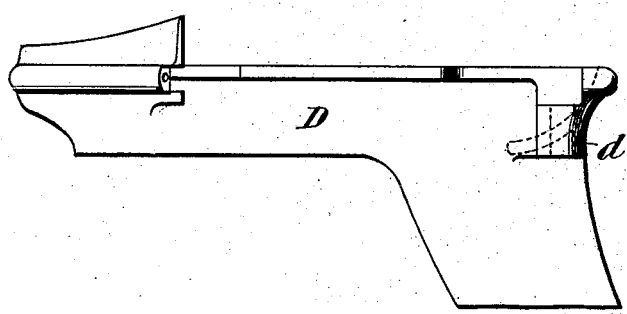
Figure 7:
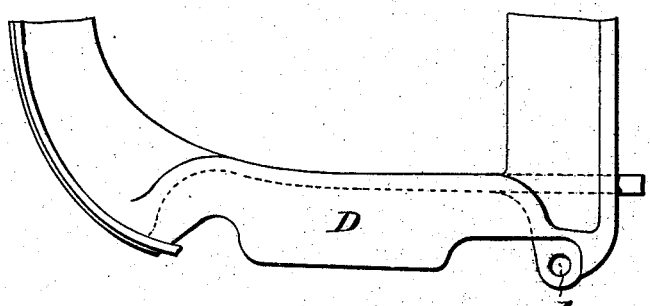
Figure 8:
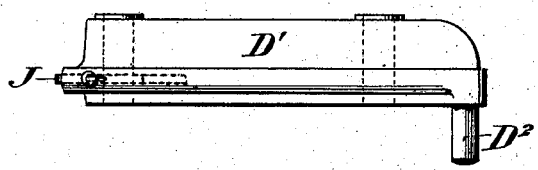
Figure 9:
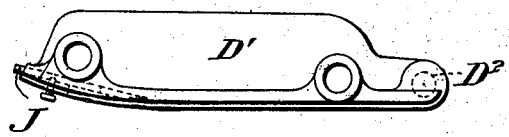
Figure 10:
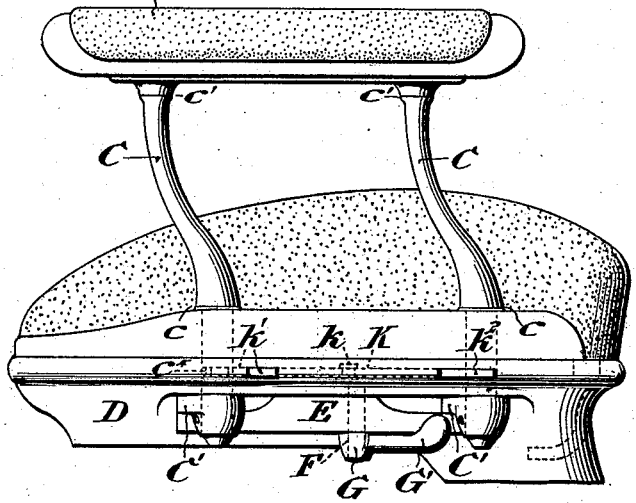
Figure 11:
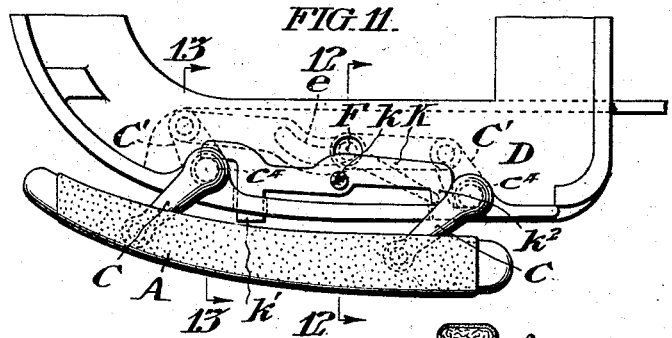
Figure 12:
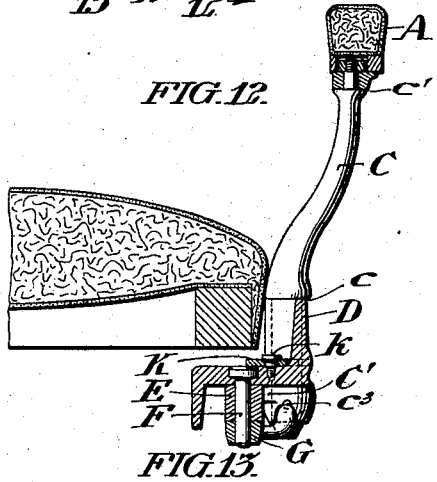
Figure 13:
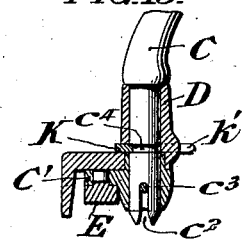

In the drawings, Figure 1 is a view in side elevation of the seat-frame and seat of a dental chair and one form of my improved arm-rest connected thereto. Fig. 2 is a plan view of a portion of said seat-frame (the seat being omitted) and said arm-rest. Fig. 3 is a view in vertical section on the line 3 3 of Fig. 1. Fig. 4 is a view in vertical section on the line 4 4 of Fig. 1. Fig. 5 is an inverted plan view showing the connecting-bar. Figs. 6 and 7 are views in side elevation and plan, respectively, of the seat-frame, the arm-rest-carrying section being omitted. Figs. 8 and 9 are side and plan views, respectively, of said arm-rest-carrying section detached. Figs. 10, 11, 12, and 13 are views corresponding, respectively, with Figs. 1, 2, 3, and 4 of an arm-rest of modified construction.

The arm-rest proper consists of a suitably-upholstered bar A, supported in a horizontal position above the side of the seat-frame D and parallel therewith. This bar is connected to said seat-frame by means of two parallel upright standards C C, which have horizontal turning connection with said seat-frame at $c$ $c$ and also with the arm-rest proper at $c'$ $c'$. The standards C C are some distance apart and are bent or curved, as shown, so that the turning connection between each standard and the seat-frame will not be in alinement with the turning connection of the respective standard with the arm-rest. By this construction the arm-rest may be moved laterally toward and away from the chair-seat, the curved standards rotating to provide for this movement. As the arm-rest should move in a direct line toward and away from the seat and be always parallel therewith, the standards C C must rotate in unison when the arm-rest is adjusted laterally. For this purpose the standards are provided on their lower extremities, which project beneath the seat-frame, with rock-arms C' C', united by a connecting-bar E.

Means are provided for locking the arm-rest in any position to which it may be adjusted. This may consist of a headed bolt F, secured to the seat-frame and passing through a curved slot $e$ in the connecting-bar, and a nut G, screwing on the lower end of the bolt and provided with an operating handle or lever G'. When the handle G' is moved toward and under the seat-frame, the connecting-bar is clamped against the seat-frame and the standards C C are firmly locked against rotation and the arm-rest held in position.

In order to provide for moving the arm-rest away from the side of the chair, thus leaving the same unobstructed, the upright standards C C may be mounted upon a movable section D' of the seat-frame D. This movable section is herein shown as connected to the seat-frame by means of a vertical pivot D², near the front of the seat-frame, a spring-bolt J or equivalent device being employed to hold the movable section in place. By unfastening the bolt the movable section carrying the arm-rest may be swung horizontally into a position in front of the chair. The connection D² between the seat-frame and the movable section thereof is preferably a detachable connection as well as pivotal in order that the arm-rest may be detached when desired. For this purpose the connection consists of a pintle $D^2$ on the movable section fitted in a corresponding socket $d$ of the seat-frame.

It is not necessary to secure the arm-rest standards C C to a movable section of the seat-frame, as other means may be employed for rendering the arm-rest detachable, or, if desired, the detachable feature may be omitted entirely.

In the construction illustrated in Figs. 10 to 13 the lower ends of the standards C C have detachable connection with the sockets of the rock-arms C', which are united by the connecting-bar E. (See Fig. 13.) A slot $c^2$ in the lower extremity of each standard, engaging a cross-pin $c^3$ in its respective socket, prevents independent turning movement of the standards and levers and at the same time permits of the former being readily detached from the latter. A simple means for preventing accidental detachment of the standards is shown as consisting of a latch-plate K, pivoted midway its length at $k$ to the seat-frame. The ends of this plate are adapted to engage annular grooves $c^4$ on the standard C, one end bearing on the inner side of one standard and the other end bearing on the opposite or outer side of the other standard. Extensions $k'$ $k^2$ of the latch-plate project one at a time slightly outside the seat-frame. By pressing the extension $k'$ inward the latch-plate is rocked and both standards are simultaneously released, while pressure upon the extension $k^2$ securely locks both standards against withdrawal. If preferred, the extension $k^2$ may be dispensed with and a spring employed for causing the latch to normally engage the standards.

I claim as my invention—

1. In an arm-rest for dental chairs, the combination of the seat-frame, two curved and parallel upright supports having horizontal turning connection with said seat-frame, an arm-rest mounted upon said supports, and means for locking said supports in any position to which they may be rotated, substantially as described.

2. In an arm-rest for dental chairs, the combination of the seat-frame, two curved and parallel upright supports having turning and detachable connection with said seat-frame, an arm-rest mounted upon said supports, and means for locking said supports in any position to which they may be rotated, substantially as described.

3. In an arm-rest for dental chairs, the combination with the seat-frame, of a movable side section thereof having horizontal turning connection therewith, two curved and parallel upright supports having horizontal turning connection with said movable section, and an arm-rest mounted upon said supports, substantially as described.

4. In an arm-rest for dental chairs, the combination with the seat-frame, of a movable side section thereof having horizontal turning connection therewith, means for locking said movable section to the seat-frame, two curved and parallel upright supports having horizontal turning connection with said movable section, and an arm-rest mounted upon said supports, substantially as described.

5. In an arm-rest for dental chairs, the combination with the seat-frame, of a detachable side section thereof, having horizontal turning connection therewith, two curved and parallel upright supports having horizontal turning connection with said movable section, and an arm-rest mounted upon said supports, substantially as described.

In testimony whereof I affix my signature in presence of two witnesses.

ARTHUR W. BROWNE.

Witnesses:
   Geo. D. Heck,
   Albert A. Sievers.